(12) United States Patent
Hagan (10) Patent No.: US 11,926,169 B2
(45) Date of Patent: Mar. 12, 2024

(54) MULTIMEDIA BUSINESS CARD

(71) Applicant: Alex Hagan, Novato, CA (US)

(72) Inventor: Alex Hagan, Novato, CA (US)

( * ) Notice: Subject to any disclaimer, the term of this patent is extended or adjusted under 35 U.S.C. 154(b) by 0 days.

(21) Appl. No.: 17/724,417

(22) Filed: Apr. 19, 2022

(65) Prior Publication Data

US 2023/0331019 A1   Oct. 19, 2023

(51) Int. Cl.
*B42D 15/02* (2006.01)
*B42D 15/04* (2006.01)
*G06Q 30/0282* (2023.01)

(52) U.S. Cl.
CPC ......... *B42D 15/022* (2013.01); *B42D 15/042* (2013.01); *G06Q 30/0282* (2013.01)

(58) Field of Classification Search
CPC ............................. B42D 15/022; B42D 15/042
See application file for complete search history.

(56) References Cited

U.S. PATENT DOCUMENTS

| | | | | |
|---|---|---|---|---|
| 8,011,122 B2 * | 9/2011 | Clegg | .................... | G11B 33/08 40/124.03 |
| D655,750 S * | 3/2012 | Clegg | .............................. | D19/1 |
| 8,312,651 B2 * | 11/2012 | Mandelbaum | ....... | B42D 15/045 40/717 |
| 2006/0134591 A1 * | 6/2006 | Karat | ...................... | G06F 21/79 434/308 |
| 2008/0289230 A1 * | 11/2008 | Mandelbaum | ....... | B42D 15/022 40/124.01 |
| 2010/0223824 A1 * | 9/2010 | Mandelbaum | ....... | B42D 15/042 40/463 |
| 2011/0154698 A1 * | 6/2011 | Lin | ...................... | B42D 15/022 40/124.03 |
| 2011/0232141 A1 * | 9/2011 | Sapp | .................... | B42D 15/022 40/124.03 |
| 2011/0247247 A1 * | 10/2011 | Mayer | ..................... | G09F 27/00 40/124.03 |
| 2012/0267276 A1 * | 10/2012 | Hunter | ................. | B42D 15/045 206/449 |
| 2014/0041264 A1 * | 2/2014 | Chambers | ............ | B42D 15/027 40/124.06 |
| 2015/0251479 A1 * | 9/2015 | Parkinson | ............ | B42D 15/022 40/124.191 |
| 2017/0297360 A1 * | 10/2017 | Milon | .................. | B42D 15/022 |

* cited by examiner

*Primary Examiner* — Gary C Hoge
(74) *Attorney, Agent, or Firm* — Fitzsimmons IP Law (57) ABSTRACT

A multimedia business card having a housing, a display, a speaker, a battery, and circuitry for operating the same is provided. In one embodiment, the housing includes a plurality of panels, scores, and joints, including a cover panel and a front panel that includes an aperture. The panels and joints can be folded and secured to form an enclosed (rectangular) housing. The display, speaker, battery, and circuity are secured inside, with the display being visible to a user via the aperture. The housing should open like a book (with a cover opening from right to left), exposing the display to the user, where the opening of the cover triggers the playing of video and/or sound (e.g., via a magnetic switch). For ease of manufacturing, the housing may be constructed from a single piece of material, preferably cardboard or a heavy paper-based product.

20 Claims, 7 Drawing Sheets

MULTIMEDIA BUSINESS CARD

BACKGROUND OF THE INVENTION

1. Field of the Invention

The present invention is directed toward a multimedia business card, and more particularly to a business card that provides audio and/or video and is relatively easy to both operate and manufacture, and to do so economically.

2. Description of Related Art

Business cards are cards bearing business information about a company or individual. They are shared during formal introductions as a convenience and/or memory aid. A business card typically includes the giver's name, company, logo, and contact information, such as their address, telephone number, email (or social media address), website, etc. Prior to COVID, approximately seven billion business cards were printed worldwide each year. During the pandemic, sales of business cards dropped 70%. However, since mid-2021, sales have rebounded and are again in popular demand.

Business cards are traditionally printed on some form of card stock, with visuals, method of printing, costs, and other details varying according to cultural, organizational norms, personal preferences, etc. There are also specialized business cards that are made from plastic (e.g., frosted translucent plastic, clear plastic, and white or metallic plastic), metal, rubber, and wood. However, regardless of what the business card is made from, it is still just a limited amount of information printed on a relatively small sized card (typically 2×3½ inches in size).

A drawback of traditional business cards is that they are relatively unimpressive as all they do is convey basic information (name, address, phone number, etc.). They are also limited in the amount of information that can be conveyed. If the giver wants to provide additional information, he/she would need to either provide the user with additional information (e.g., a catalog, brochure, etc.) or direct the user to an electronic location for additional information (e.g., a website). Not only is this cumbersome, but it requires the recipient to receive and transport a bulk of material, which is the antithesis of a business card (i.e., a small piece of paper with limited information that can fit in a person's wallet or pocket). While additional information can be provided by way of a website or social media address, this requires the recipient to enter such information into a computer later, but only if the recipient (a) remembers, (b) hasn't lost the business card in the meantime, and (c) has the business card with them when they are at their computer.

In light of the foregoing, there is a need for a new and improved business card that addresses the foregoing drawbacks. The business card should provide the recipient with additional information and do so impressively (e.g., via video, sound, etc.). The business card should also be relatively easy to operate and relatively easy and inexpensive to manufacture.

SUMMARY OF THE INVENTION

The present invention provides a multimedia business card that overcomes the aforementioned drawbacks in the prior art. In preferred embodiments of the present invention, the multimedia business card includes at least a housing, a display, a speaker, a battery and circuitry for operating the same. The business card should be relatively easy to operate and relatively easy and inexpensive to manufacture. In preferred embodiments of the present invention, the business card includes a housing that opens like a book (with a cover opening from right to left), exposing a display to a user, where the opening of the cover triggers the playing of video and/or sound. However, another aspect of the present invention is a manufacturing process that is relatively simple and cost efficient—involving a housing that is constructed from a single piece of material; preferably cardboard or a heavy paper-based product.

In one embodiment of the present invention, a housing is constructed from a single sheet of material (e.g. ; cardboard, etc.) having a plurality of panels, scores, and joints. The housing may include a back panel, a left panel, a right panel, a front panel with an aperture therein, a top panel, and a bottom panel, with scores therebetween (allowing each panel to be folded). The housing further comprises a plurality of joints, with scores therebetween, that can be used to secure the housing once constructed (e.g., using glue, etc.).

The housing should also include a cover panel. Once the panels (front, back, top, bottom, left, and right) and joints are folded and secured, thereby forming an enclosed (rectangular) housing, the cover panel can be closed (substantially covering the front panel) or opened (exposing the front panel and the aperture therein).

During construction, a display (e.g., LCD), a speaker, a battery, circuitry (e.g., microprocessor, memory, etc.), etc., should be placed (and preferably secured) inside the housing. Securing the items may be accomplished by affixing the foregoing directly to the housing (e.g., via glue, screws, etc.) and/or connecting them electrically to one another (e.g., via wires, etc.). Alternatively, the foregoing (or portions thereof) may be attached (e.g., glued, screwed, soldered, etc.) to a printed circuit board (PCB), which in turn can be affixed to the housing. In one embodiment, the memory device is configured to store data (e.g., video and sound) and commands (e.g., code and/or instructions, including those for presenting data to the user via the display and/or speaker), the microprocessor is configured to executing the code and/or instructions, and the battery is used to power at least the memory device and the microprocessor. The battery may also be used to power other electrical devices (e.g., the display, a backlight portion thereof, etc.).

To extend battery life, operation of the business card (e.g., operating the display, certain circuitry, etc.) should be controlled by a switch, which can be moved from a first state (e.g., closed) to a second state (e.g., opened) and vice versa. When the switch is placed in its first state, the electrical devices (e.g., LCD, microprocessor, memory, etc.) (or portions thereof) should be inactivated (e.g., shut down) or at least placed in a "sleep" state to preserve power. To the contrary, when the switch is changed to its second state, the microprocessor should be configured to present data (e.g., text, images (still or moving, also referred to as video), and/or audio) to the user via the display and/or speaker.

In a preferred embodiment, the data presented to the user is done so sequentially and has a beginning and an end (e.g., the data may be a video with a beginning and an end). When the switch is changed from the first state to the second state, the data should be presented to the user sequentially, from the beginning to the end. At the end of the presentation, the microprocessor can either be configured to present the data again (in a loop) or enter an inactive or sleep state (to preserve power).

In one embodiment of the present invention, the switch is a magnetic switch, or an electrical switch that makes or breaks contact in the presence of a magnetic field and includes first and second portions, where the first portion is secured to (or inside) the front panel of the housing and the second portion is secured to (or inside) the cover panel of the housing. When the cover is closed, the switch is placed in its first state (i.e., closed), thereby deactivating or placing the electrical devices in a "sleep" state. When the cover is opened, the switch is moved into its second state (i.e., opened) and the data is presented to the user via the display and/or speaker. This not only preserves power but simplifies use of the business card. All the user has to do is open the cover and the video/audio plays automatically. When the user closes the cover, the video/audio stops and the electrical devices (or portions thereof) are turned off (or placed into a "sleep" state), thereby preserving power.

A more complete understanding of a multimedia business card will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

The present invention provides a multimedia business card that includes at least a housing, a liquid crystal display, a speaker, and circuitry for operating the same. In preferred embodiments of the present invention, the business card is relatively easy to operate and is relatively easy and inexpensive to manufacture. In the detailed description that follows, like element numerals are used to describe like elements shown in one or more of the figures.

Figure 1:
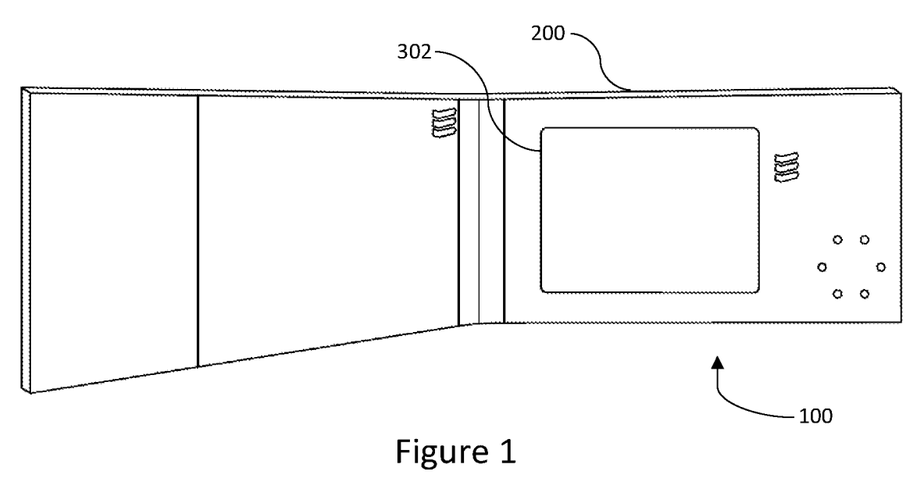
FIG. 1 is a perspective view of a multimedia business card in accordance with one embodiment of the present invention.

In preferred embodiments of the present invention, as shown in FIG. 1, the business card 100 includes a housing 200 that opens like a book (with a cover opening from right to left), exposing a liquid crystal display (LCD) to a user, where the opening of the cover triggers the playing of video and/or sound. The present invention, however, is not so limited. For example, a housing with a removable cover, or no cover at all (where a switch is used to trigger the playing of video and/or sound) are within the spirit and scope of the present invention. It should also be appreciated that while the present invention is described as being multimedia, a business card that only provides audio, or only provides video (or still images), is within the spirit and scope of the present invention.

Another aspect of the present invention is a manufacturing process that is relatively simple and cost efficient—involving a housing that is constructed from a single piece of material; preferably cardboard or a heavy paper-based product. While traditional housings for LCD products are plastic or metal (e.g., for durability, rigidity, etc.), the present invention should be not only easy to manufacture, but relatively inexpensive, even if the material provides less protection than traditional LCD housings. In other words, while cardboard (or paper) may seem like a poor, ineffective housing for an LCD and electronic circuitry, given the nature of the goods (i.e., a business card, which is traditionally a temporary, inexpensive, disposable product), the inventor has found this material to be sufficient, and a cost-effective alternative to other structures. It also provides for surfaces that can easily be printed on, e.g., company name, address, phone number, website, email, logo, etc., and constructed into a supportive housing.

With that being said, the present invention is not limited to a housing that is constructed from a single sheet of cardboard (or some other paper stock), but further includes housing that are constructed from other materials (e.g., plastic, fiberglass, carbon fiber, etc.) and housings that are constructed from more than one sheet of material. For example, a housing that is constructed from two sheets of materials, where one sheet is constructed into an open-top box, and the other sheet is constructed into a lid for the box, where the two can be assembled together to form a secure housing for the LCD, etc., is within the spirit and scope of the present invention.

In one embodiment of the present invention, a housing is constructed from a single sheet of material (e.g., cardboard, etc.) having a plurality of panels, scores, and joints, which have the following definitions: (1) panel=a "face" or "side" of a box; (2) joint=the opposite edges of a box that are either glued, stapled, wire stitched or taped together to form the box; and (3) score=an impression or crease in the corrugated or solid fiberboard, made to position and facilitate folds. This embodiment can best been seen in FIG. 2A where the housing 200 includes a back panel 202, left and right panels (202A, 202B), a cover panel 204, a front panel 206, a top panel 208, and a bottom panel 210, with scores therebetween (allowing each panel to be folded (e.g., parallel to the adjacent panel). The housing 200 further comprises a plurality of joints (208A-C, 210A-C), with scores therebetween, that can be used to secure the housing 200 once constructed (see FIGS. 2D-F) (e.g., using glue, etc.).

First, joints 208A-C and 210A-C are folded upward, perpendicular to the top and bottom panels 208, 210. The top and bottom panels are then folded upward, perpendicular to the back panel 202, resulting in the configuration shown in FIG. 2B. In this configuration, joints 208A and C are perpendicular to both the top panel 208 and the back panel 202, joints 210A and C are perpendicular to both the bottom panel 208 and the back panel 202, and joints 208B and 210 B are perpendicular to the top and bottom panels (208, 210), respectively, and parallel to the back panel 202, By placing a touch of glue (or any other adhesive or affixing material) on the outer surfaces of the joints (208A-C, 210A-C), the joints can then be affixed to the inner surfaces of the left panel 202A, right panel 202B, and front panel 206, once these panels are folded upward (see, e.g., FIGS. 2E and F).

Figure 2A:
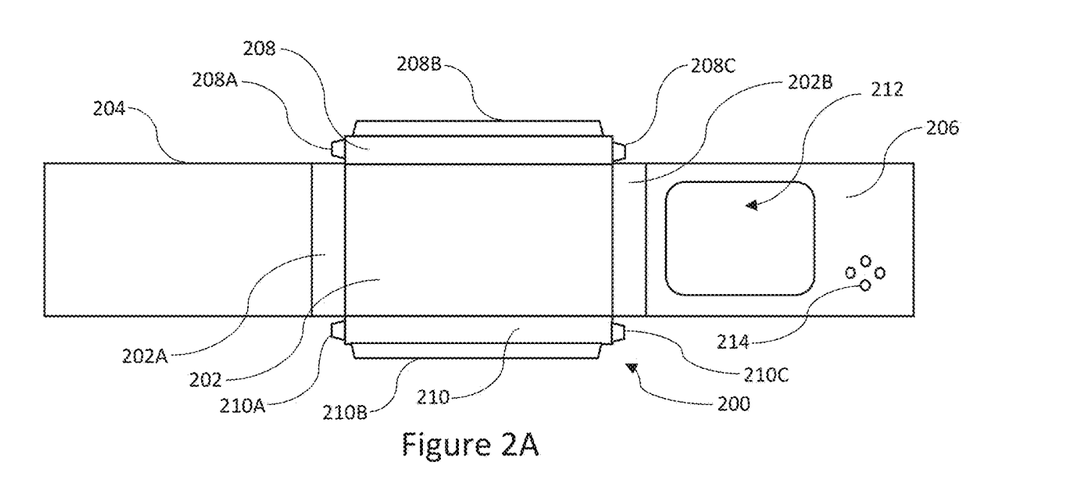
FIGS. 2A-F depicts a single sheet of material in accordance with one embodiment and how it can be assembled into a housing for the multimedia business card of the present invention.
Figure 2B:
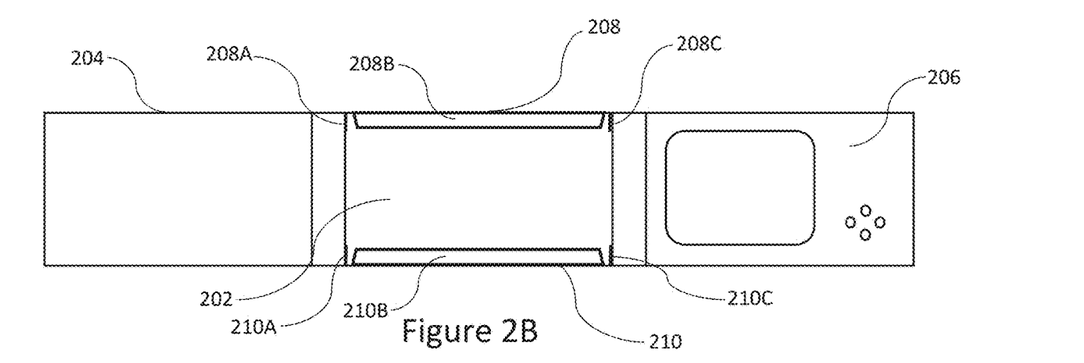
Figure 4:
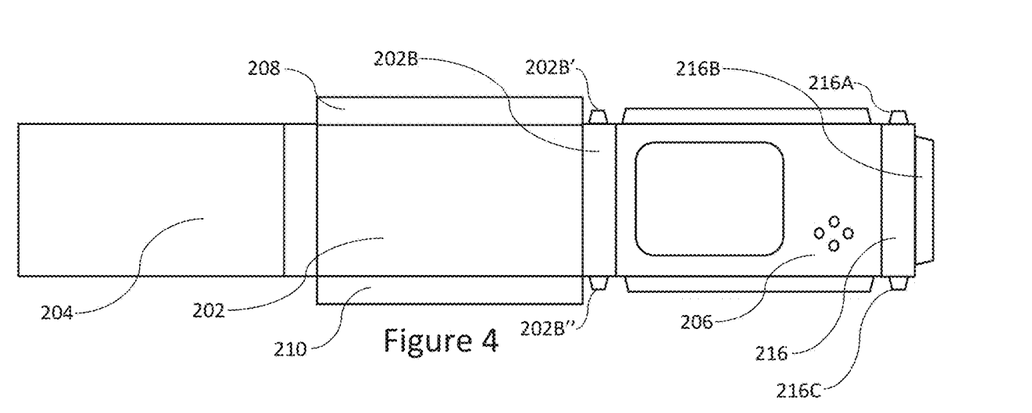
Figures 5, 6A:
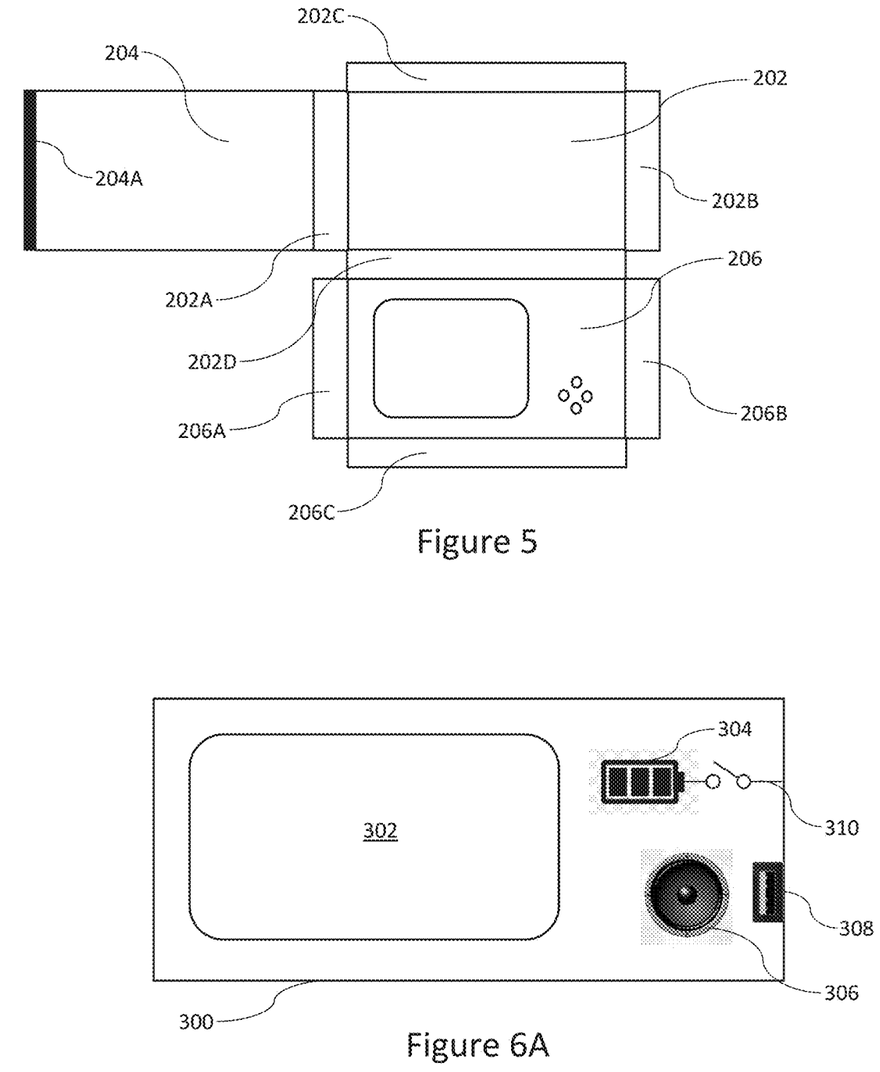
FIG. 6A depicts a front side of a printed circuit board (PCB) in accordance with one embodiment of the present invention, which may include an LCD, speaker, battery, USB port, and a switch.

It should be appreciated that the present invention is not limited to the joints that are depicted in FIGS. 2A, and may include fewer or additional joints (see, e.g., FIGS. 3 and 4), or no joints at all (see, e.g., FIG. 5). It should also be appreciated that the present invention is not limited to glue to affix a joint to a panel, a joint to a joint, or a panel to a panel. For example, a housing that is secured together using any means generally known to those skilled in the art (e.g., staples, tape, wire stitch, screws, Velcro™, etc.) is within the spirit and scope of the present invention. This includes, but it not limited to, affixing means that are commonly used to secure carboard assemblies (e.g., boxes, packaging for goods (manufactured goods, perishables, etc.), etc.).

Figure 2C:
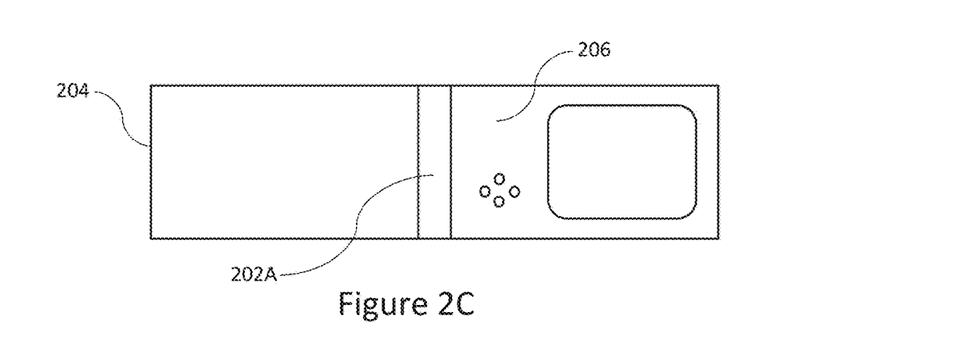
Figure 2D:
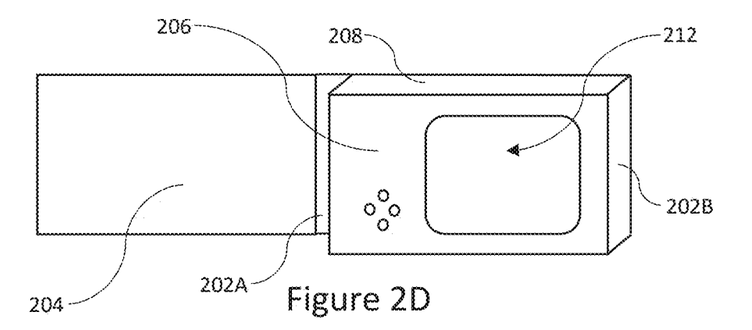
Figure 2E:
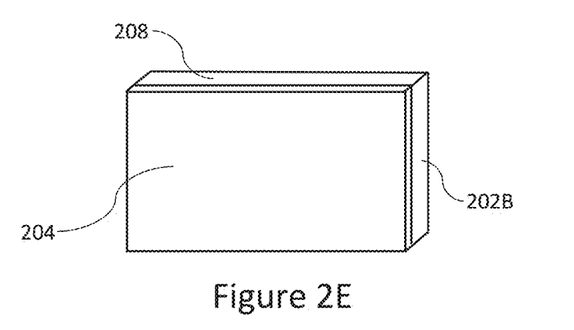
Figure 2F:
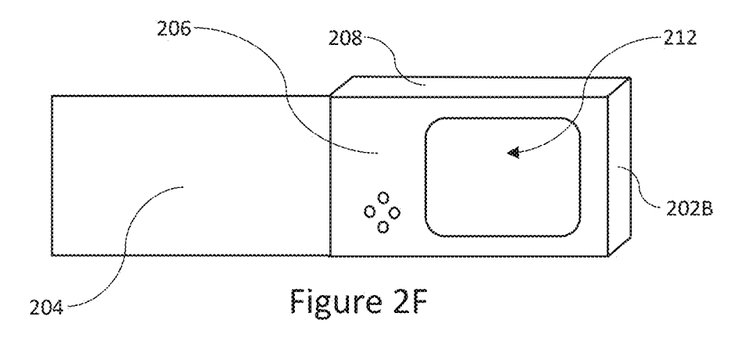

The right panel 202B is then folded upward, perpendicular to the back panel 202, and the front panel 206 is folded, perpendicular to the right panel 2028 and parallel to the back panel 202 (see FIG. 2C). It is at this point that right panel 2023 is secured to joints 208C, 210C, and the front panel is secured to joints 208B, 210B (e.g., using glue, etc.) (see above). A three-dimensional view of this configuration is provided in FIG. 2D. The left panel 202A can then be folded upward, perpendicular to the back panel 202, and the cover panel 204 can be folded, perpendicular to the left panel 202A and parallel to the back panel (see FIGS. 2E and F). It is at this point that the left panel 202A can then be secured to joints 208A, 210A, and the cover can be closed (see FIG. 2E) or opened (see FIG. 2F) (e.g., to expose the LCD to the user).

Figure 3:
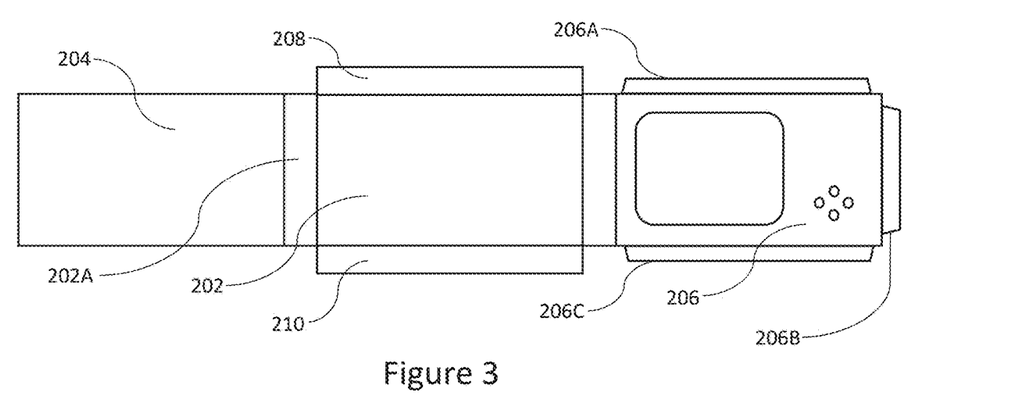
FIGS. 3-5 illustrate different sheets of materials that can be used to form a housing in accordance with alternate embodiments of the present invention.

As discussed above, the present invention is not limited to the housing 200 depicted in FIG. 2A, and other housings are within the spirit and scope of the present invention. For example, as shown in FIG. 3, the joints 206A-C may extend from the front panel 206, instead of the top and bottom panels 208, 210. In this embodiment, joint 206A would be secured to the top panel 208, joint 206E would be secured to the left panel 202A, and joint 206C would be secured to the bottom panel 210. Obviously, alternate embodiments, where joints extend from other panels are within the spirit and scope of the present invention.

By way of another example, FIG. 4 illustrates an alternate housing with additional joints (216A-C, 2023', 2023") and an additional panel 216. In this embodiment, joints 206A-C would be secured as discussed above (see FIG. 3) and joints 202B' and 202B" would be secured to the top and bottom joints (208, 210), respectively, as would joints 216A and 216B. Not only does this embodiment have additional joints (providing further structural integrity) but it also has an additional panel (i.e., 216), which can be secured to the top panel 208 via joint 216A, to the bottom panel 210 via joint 216C, and to the bottom panel 202 via joint 216B. Not only does this provide for a stronger housing, but it allows the housing to remain enclosed (on all six sides) and still lie flat (on its back) when the cover is open (see, e.g., FIG. 2D). In other words, by securing panel 216 (or more particular, joint 216B) to the back panel, the left panel 202A remains free to fold away from the housing when the cover is in its open position.

FIG. 5 provides yet another example, where the front panel 206 folds upward from the bottom of the back panel 202 instead of from the side. This embodiment is also different in that there are no joints, but additional panels that can be affixed (e.g., glued) to one another. For example, panel 202A can be affixed to panel 206A, panel 202B can be affixed to panel 206B, and panel 202C can be affixed to panel 206C. The cover panel 204 is also extended (length-wise) to include lip 204A, which, when the housing 200 is in its closed position, extends over the edge of the front panel 206, making it easier for the user to open the housing 200 (i.e., via the lip 204A), This is contrary to the embodiment shown in FIG. 2A, where dimensions are more uniform.

For example, in the embodiment shown in FIG. 2A, the length of the cover panel 204 is substantially the same as the length of the back panel 202, which is substantially the same as is the lengths of the front panel 206, the top panel 208, and the bottom panel 210. As are the heights, Similarly, the height of the back panel 202 is substantially the same as heights of the left panel 202A and the right panel 202B, and the height of the top panel 208 is substantially the same as the height of the bottom panel 210. The term "substantially" is used herein to denote that minor differences are within the spirit and scope of the present invention and may be necessary for construction (e.g., the length of the top panel 208 may be slightly shorter than the length of the back panel 202 so that the left panel 202A will properly align with joint 208A, etc.). As previously stated, the present invention is not limited to any particular housing and a housing that includes features from multiple embodiments (e.g., a top panel that folds upward, as shown in FIG. 5, but includes joints, like the ones illustrated in FIG. 3) is within the spirit and scope of the present invention.

At some point during construction, a display, a speaker, a battery, circuitry (e.g., microprocessor, memory, etc.), etc., must be placed (and preferably secured) inside the housing. This may be done at any point (e.g., prior to assembly (see FIG. 2A), after a portion of the housing has been assembled (see FIGS. 2B, 2C, etc.), etc.). Securing the items may be accomplished by affixing the foregoing directly to the housing (e.g., via glue, screws, etc.) and/or connecting them electrically to one another (e.g., via wires, etc.). Alternatively, the foregoing (or portions thereof) may be attached (e.g., glued, screwed, soldered, etc.) to a printed circuit board (PCB), which in turn can be affixed to the housing.

Figure 7:
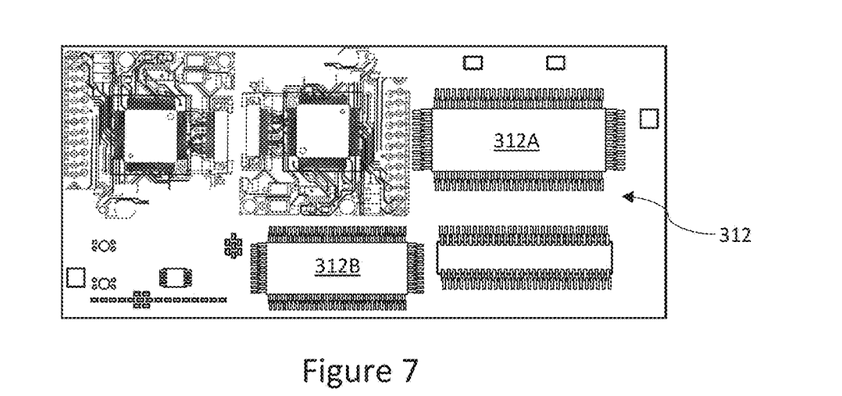
FIG. 7 depicts a backside of the PCB illustrated in FIG. 6A in accordance with one embodiment of the present invention, which may include circuitry, such as a processor and a memory device.

For example, as shown in FIG. 6A, a liquid crystal display (LCD) may be affixed (both physically and electrically) to a front side of a PCB 300, along with a speaker 306, a battery 304, a switch 310, and in certain embodiments, a connector 308. As shown in FIG. 7, supporting circuitry 312 may be affixed (both physically and electrically) to a backside of the PCB 300. This may include at least one microprocessor 312A and at least one memory device 312B, where the memory device 312B is configured to store data (e.g., images (still or moving, also known as video), text, sounds, etc.) and commands (e.g., code and/or instructions, including those for presenting data to the user via the LCD and/or speaker), and the microprocessor 312A is configured to executing the code and/or instructions. Those skilled in the art will understand that the PCB may further includes tracks (e.g., copper conductors) that are configured to electrically connect components that are affixed to the PCB (e.g., via solder). Wires may also be used to electrically connect certain components, both on and off the PCB. For example, wires may be used to connect the PCB (or components thereon) to the LCD and/or speaker (or PCBs associated therewith).

With reference back to FIG. 6A, the battery 304 is used to power the electrical devices inside the housing (e.g., the display, processor, memory, etc.) and the optional connector can be used to program (or reprogram) the microprocessor 312A and/or store code/data on the memory device 312B. Alternatively, the microprocessor 312A and/or memory device 312E can be programmed, etc., prior to assembly (e.g., prior to being placed inside the housing). To extend battery life, operation of the business card (e.g., operating the LCD, certain circuity, etc.) should be controlled by a switch 310, which can be placed in a first state (e.g., closed) and a second state (e.g., opened). When the switch is placed in its first state, the electrical devices (e.g., LCD, microprocessor, memory, etc.) should be inactivated (e.g., shut down) or at least placed in a "sleep" state to preserve power. To the contrary, when the switch is changed to its second state, the microprocessor should be configured to present data (e.g., text, images (still or moving, also referred to as video), and/or audio) to the user via the LCD and/or speaker.

In a preferred embodiment, the data presented to the user is done so sequentially and has a beginning and an end (e.g., the data may be a video with a beginning and an end). When the switch is changed from the first state to the second state, the data should be presented to the user sequentially, from the beginning to the end. At the end of the presentation, the microprocessor can either be configured to present the data again (in a loop) or enter an inactive or sleep state (to preserve power). Alternatively, when the switch is changed from the first state to the second, the microprocessor could be configured to play the data sequentially from wherever the user left off (wherever the data was when the switch was moved from the second state to the first). This configuration should be based on manufacturing design preferences.

It should be appreciated that the present invention is not limited to the components illustrated in FIGS. 6A and 7, and a multimedia business card having different, additional, and/or fewer components are within spirit and scope of the present invention, For example, while an LCD is preferred, those skilled in the art will realize that any display (e.g., plasma, LED, etc.) can be used. Similarly, while the connector 308 is preferably a USB (or micro-USB) connector, other connectors are within the spirit and scope of the present invention. A wireless connection (e.g., WiFi, Bluetooth, etc.) could also (or alternatively) be provided, Finally, while the switch could be a manual switch (e.g., toggle, push-button, slide, etc.), one objective of the present invention is ease of use. To this end, the switch is preferably a magnetic switch, or an electrical switch that makes or breaks contact in the presence of a magnetic field.

Figure 6B:
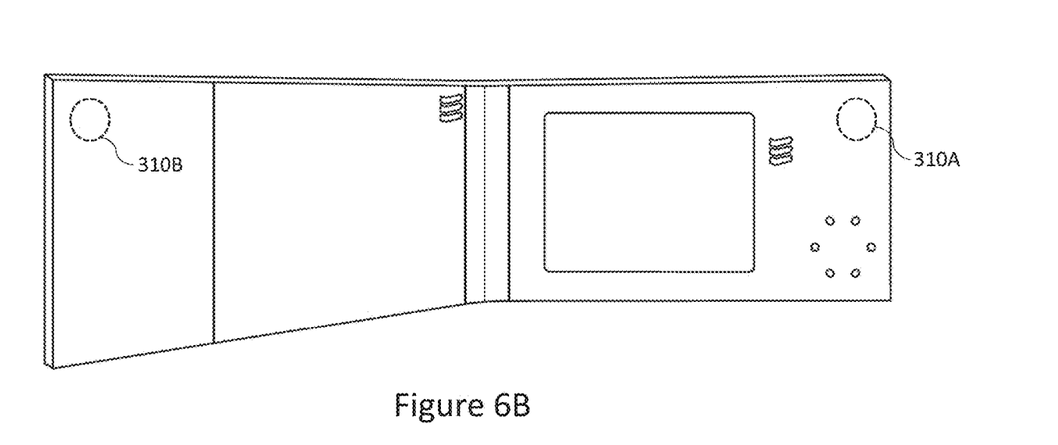
FIG. 6B illustrates how the switch depicted in FIG. 6A may include two portions, a first portion disposed on a front pan& of the housing and a second portion disposed on a cover panel of the housing.

As shown in FIG. 6B, a first portion of the magnetic switch 310A may be secured to (or inside) the front panel of the housing and a second portion of the magnetic switch 310B may be secured to (or inside) the cover panel of the housing. That way, when the cover is closed (see, e.g., FIG. 2E), the switch is placed in the first state (i.e., closed), thereby deactivating or placing the electrical devices in a "sleep" state. When the cover is opened (see, e.g., FIG. 2F), the switch is moved into the second state (i.e., opened) and the data is presented to the user via the LCD and/or speaker. This not only preserves power but simplifies use of the business card (i.e., all the user has to do is open the cover and the video/audio plays and closing the cover turns the device off and preserves power).

Figure 8:
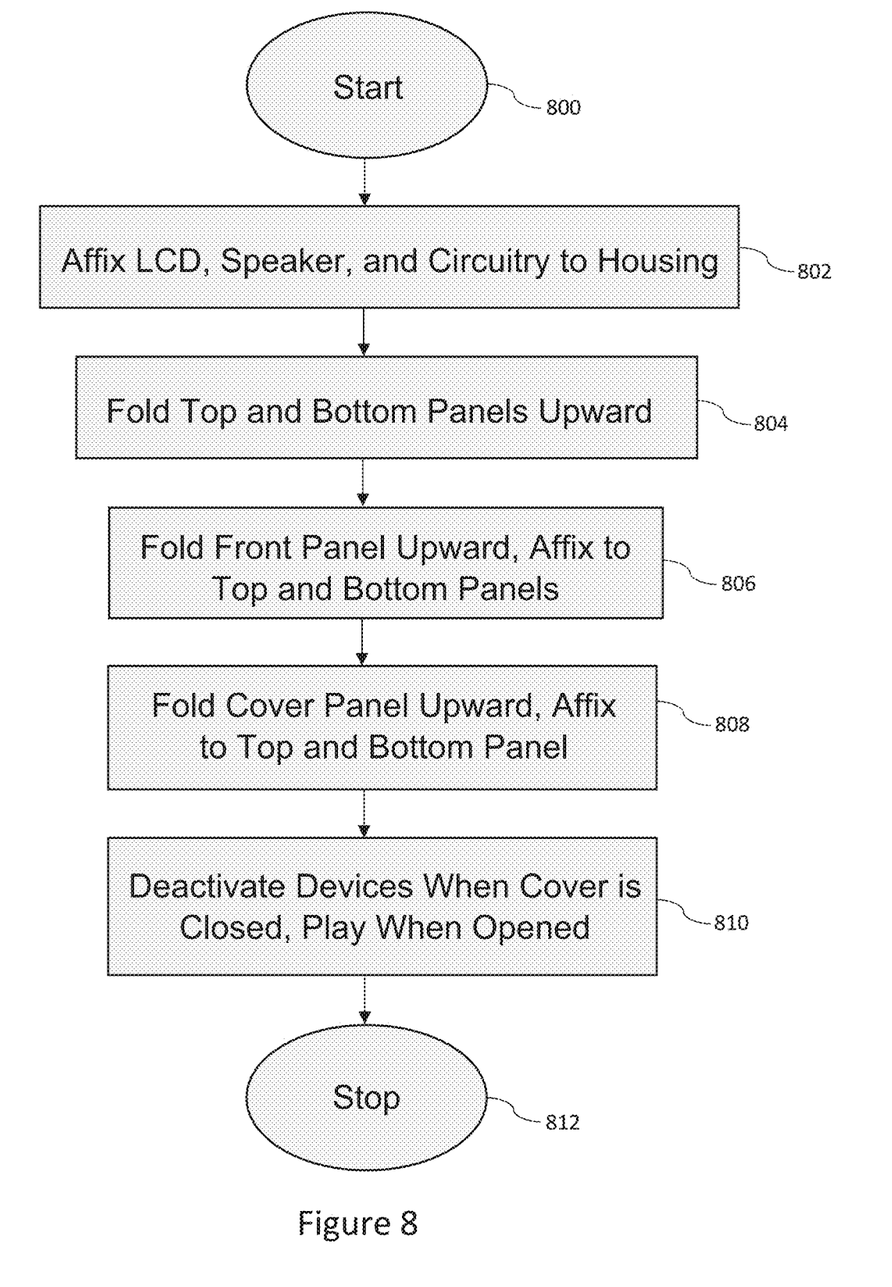
FIG. 8 illustrates a method of making and operating a multimedia business card in accordance with one embodiment of the present invention.

This simplicity can be seen in FIG. 8, which provides a method of manufacturing and operating a business card in accordance with one embodiment of the present invention. Starting at step 800, an LCD, speaker, circuitry, etc., is affixed to a housing at step 802, which is preferably a single sheet of cardboard. At step 804, top and bottom panels, which may include a plurality of joints, are folded upward. A front panel is then folded upward and affixed (e.g. ; glued) to the top and bottom panels (or joint portions thereof) at step 806. A cover portion is then folded upward and affixed (e.g., glued) to the top and bottom panels (or joint portions thereof) at step 808. When the cover is in the closed position (step 808), the switch is closed (first state), deactivating (or placing in a "sleep" state) the electrical devices. At step 810, when the cover is opened, the switch is opened (second state), and the microprocessor is configured to present the data to the use via the display and/or speaker.

As discussed above, it should be appreciated that the present invention is not limited to the manufacturing and/or operational method described in FIG. 8, and that additional, fewer, and/or different steps are within the spirit and scope of the present invention. For example, different steps may be required in assembling the housing. This may include folding left and right panels upward, folding other panels and/or joints (see, e.g., FIGS. 3-5), etc. By way of another example, other steps may be necessary to activate and/or deactivate the electrical devices inside the housing (e.g., a switch may be pressed by a user, etc.).

Having thus described a preferred embodiment for a multimedia business card, it should be apparent to those skilled in the art that certain advantages have been achieved. It should also be appreciated that various modifications, adaptations, and alternative embodiments thereof may be made within the scope and spirit of the present invention. The invention is further defined by the following claims.

What is claimed is:

1. A multimedia business card, comprising:
a housing having at least a back panel, a front panel, top and bottom panels, left and right panels, and a cover panel, wherein said top, bottom, left and right panels are perpendicular to said back panel, each having a height that defines a thickness of said housing, said front panel includes an aperture, and said back panel has a length that is substantially equal to a length of said front panel and is fixed beneath and substantially parallel to said front panel, collectively defining a housing therebetween, and said cover panel has (1) a second left panel and a first portion with a score therebetween and (2) a length that is greater than said length of said front panel and is movable between at least a first position where said second left panel is perpendicular to said front panel and said first portion is folded over said front panel, substantially covering said aperture, and a second position where both said first portion and said second left panel are coplanar with said back panel;
a display disposed within said housing and visible through said aperture in said front panel of said housing;
a switch that can be moved between a first state and a second state, said switch being in said first state when said cover panel is in said first position, thereby covering said aperture, and said switch being in said second state when said cover panel is moved away from said first position, toward said second position, thereby exposing said aperture and a visible portion of said display to a user; and
circuitry electrically connected to said display and said switch, said circuitry being configured to automatically present images on said display when said switch is changed from said first state to said second state.

2. The multimedia business card of claim 1, wherein said first portion of said cover panel is longer than said front panel, thereby providing an lip making it easier to grasp said cover panel to move it from said first position to said second position.

3. The multimedia business card of claim 2, wherein said switch is further configured to power down said display when said switch is in said first state and to power on said display when said switch is in said second state.

4. The multimedia business card of claim 1, wherein said front panel further comprises at least one other aperture for presenting sound to said user.

5. The multimedia business card of claim 1, wherein said housing comprises a single sheet of cardboard with text and images printed on at least one side and at least said left and right panels extend from said front panel with scores therebetween.

6. The multimedia business card of claim 5, wherein said single sheet of cardboard is folded into said housing by (i) positioning at least said top, bottom, and right panels perpendicular to said back panel, (ii) positioning said front panel parallel to said back panel, and (iii) affixing said front panel to at least said top and bottom panels.

7. The multimedia business card of claim 1, wherein said switch is a magnetic switch and comprises at least a first portion affixed to said front panel of said housing and a second portion affixed to said cover panel of said housing so that said first and second portions are adjacent one another when said cover panel is in said first position.

8. The multimedia business card of claim 1, wherein said circuitry comprises at least one integrated circuit (IC) for presenting said images on said display when said switch is changed from said first state to said second state.

9. The multimedia business card of claim 8, further comprises as least one battery for powering at least said IC.

10. The multimedia business card of claim 8, wherein said circuitry further comprises at least one memory device for storing at least said images, wherein said images are presented in a sequential order starting with a first one of said images when said switch is changed from said first state to said second state regardless of which one of said images was last presented on said display.

11. The multimedia business card of claim 8, further comprises a speaker for presenting sound to said user when said switch is changed from said first state to said second state.

12. The multimedia business card of claim 10, further comprising at least one connector, allowing said images to be stored on said at least one memory device, said images being provided from an external source.

13. A multimedia business card, comprising:
a rectangular housing having at least a cover panel, a back panel, a front cover panel having an aperture, a top panel, a bottom panel, a right panel, and a left panel, wherein said rectangular housing is constructed by (i) folding said top, bottom, left, and right panels downward until they are perpendicular to said front panel, (ii) bending said front panel until said front panel is parallel to said back panel, and (iii) affixing said back panel to at least said top, bottom, and right panels, wherein said cover panel extends from said back panel and is movable from a first position where a second left panel of said front panel is perpendicular to said back panel and a first portion of said cover panel is folded over said front panel, substantially covering said aperture, and a second position where both said first portion and said second left panel of said cover panel are coplanar with said back panel, where a score separates said first portion and said second left panel of said cover panel;
a display disposed within said rectangular housing and visible through said aperture in said front panel of said rectangular housing;
a switch that can be changed from a first state to a second state, said switch being in said first state when said cover panel is in said first position, thereby covering said aperture, and said switch being in said second state when said cover panel is moved away from said first position, toward said second position, thereby exposing said aperture and a visible portion of said display; and
circuitry electrically connected to said display and said switch, said circuitry being configured to automatically present images on said display when said switch is changed from said first state to said second state.

14. The multimedia business card of claim 13, wherein said front panel further comprises at least one other aperture for presenting sound to said user.

15. The multimedia business card of claim 13, wherein said rectangular housing comprises a single sheet of cardboard with text and images printed on at least one side, and said first portion of said cover panel is longer than said front panel, thereby making it easier to grasp said cover panel and move it from said first position to said second position.

16. The multimedia business card of claim 13, wherein said switch is magnetic and comprises at least a first portion affixed to said front panel of said rectangular housing and a second portion affixed to said cover panel of said rectangular housing so that said first and second portions are adjacent one another when said cover panel of said rectangular housing is in said first position.

17. The multimedia business card of claim 13, wherein said circuitry comprises at least one integrated circuit (IC) for presenting images on said display in a sequential order when said switch is changed from said first state to said second state, said sequential order starting with a first one of said images every time said switch is changed from said first state to said second state regardless of which one of said images was last presented on said display.

18. The multimedia business card of claim 17, wherein said circuitry further comprises as least one memory device for storing at least said images.

19. The multimedia business card of claim 18, further comprises at least one battery for powering at least said display only when said switch is in said first state.

20. The multimedia business card of claim 19, further comprises a backlight that is powered on when said switch is changed from said first state to said second state.

* * * * *